April 25, 1967     J. E. TAYLOR     3,316,415

SOLID MEDIUM THERMAL ENGINES

Filed July 1, 1965

INVENTOR.
JOHN E. TAYLOR
BY
Elliott & Pastoriza
ATTORNEYS

April 25, 1967  J. E. TAYLOR  3,316,415
SOLID MEDIUM THERMAL ENGINES
Filed July 1, 1965  5 Sheets-Sheet 2

INVENTOR.
JOHN E. TAYLOR
BY
*Elliott & Pastoriza*
ATTORNEYS

April 25, 1967 — J. E. TAYLOR — 3,316,415
SOLID MEDIUM THERMAL ENGINES
Filed July 1, 1965 — 5 Sheets-Sheet 3

INVENTOR.
JOHN E. TAYLOR
BY
Elliott & Pastoriza
ATTORNEYS

April 25, 1967 J. E. TAYLOR 3,316,415
SOLID MEDIUM THERMAL ENGINES
Filed July 1, 1965 5 Sheets-Sheet 4

INVENTOR.
JOHN E. TAYLOR
BY
Elliott & Pastoriza
ATTORNEYS

April 25, 1967  J. E. TAYLOR  3,316,415
SOLID MEDIUM THERMAL ENGINES
Filed July 1, 1965  5 Sheets-Sheet 5

INVENTOR.
JOHN E. TAYLOR
BY
Elliott & Pastoriza
ATTORNEYS

United States Patent Office

3,316,415
Patented Apr. 25, 1967

3,316,415
SOLID MEDIUM THERMAL ENGINES
John E. Taylor, 10644 Blythe Ave.,
Los Angeles, Calif. 90064
Filed July 1, 1965, Ser. No. 470,340
23 Claims. (Cl. 290—1)

ABSTRACT OF THE DISCLOSURE

The underlying features of the present invention include the provision of a mounting structure in combination with an elongated solid material, preferably in the form of a band of bi-metallic metal closed on itself to form a closed loop. This loop is wrapped about the mounting means which may take the form of two or more pulleys. When a portion of the band is heated, it is distorted in such a manner that a force component is generated at one of the portions of the band engaged by the mounting means, such as by one of the pulleys or rollers in such a manner as to cause a physical movement of the band with respect to the mounting means. Since the band is a closed endless loop, it will simply move in one direction as long as heat is applied at a portion of the band in the vicinity of its engagement with the mounting means. In this respect, other portions of the band must be subject to a different temperatrue so that they will not be distorted to the same extent as the heated portion. In other words, it is the distortion in the band caused by heating or a temperature differential which results in the component of force to cause physical motion. This physical motion may be of the mounting means relative to the band, or of the band relative to the mounting means.

---

This application is a continuation-in-part of my copending application Ser. No. 387,639 filed Aug. 5, 1964 for Solid Medium Thermal Engine, now abandoned.

This invention relates generally to thermal engines and variations thereof, and more particularly concerns novel solid medium type thermal engines designed to move directly in response to thermal energy to provide uniform rotary motion.

A primary object of this invention accordingly is to provide an engine in which a medium is caused to move directly in response to a heat source and in which the speed or rate of movement is a function of the temperature to the end that a power source is provided which may be controlled by temperature variations.

More particularly, it is an object to provide a thermal engine capable of converting heat from a source directly into electrical energy.

Another object is to provide a thermal engine capable of transferring heat from one region to another in which the energy for operating the engine is derived from the heat itself to the end that a wholly self-contained heat exchanger results.

Still another important object is to provide a thermal engine capable of measuring exteremly high temperatures by mechanical means wherein the temperature itself being measured serves as the energy source for the desired measurement indication.

Another object is to provide a solid medium thermal engine particularly well adapted to self-regulation to the end that a mechanical or electrical output from the engine is governed.

Still a further object of the present invention is to provide a novel type solid medium thermal engine suitable for staging so that higher thermal efficiency may be obtained or achieved.

Yet another object of the present invention is to provide an improved solid medium thermal engine which in certain applications inherently embodies a construction such that it may be operated in either a clockwise or counter clockwise direction.

Still a further object of the present invention is to provide a solid medium type thermal engine which is readily susceptible of configurations enabling regeneration or in which a part of the heat withdrawn in cooling the medium recirculates to contribute heating part of the engine cycle.

Still a further object of the present invention is to provide an improved thermal engine susceptible of configurations whereby the engine may have any one of a plurality of cycles.

Briefly, these and many other objects and advantages of this invention are attained by providing a solid medium responsive to heat applied to a portion of the medium to cause this portion to distort. Means are provided such that the solid medium is placed in a configuration having regions of high curvature and low curvature in alternation.

As a consequence of the distortion caused by heat applied to the solid medium, a biasing force is built up in the solid medium which will tend to urge the solid medium in a direction relieving the force. Stated in another way, the potential energy level of the solid medium is raised by the application of heat; therefore, the solid medium will tend to seek out a lower level of potential energy by moving in a direction to achieve this end.

In one embodiment of the invention, means are provided for applying a force to the medium adjacent to one side of the center point of the distorted portion, together with means for mounting the medium for movement in a given direction. By this arrangement, distortion of the portion as a consequence of the presence of heat, results in the generation of a component of the applied force in a direction to move the medium. The degree of distortion of the medium is a function of the degree of temperature applied, and in consequence, the component of force generated depends upon the degree of distortion, and the speed of movement of the medium will generally be a function of the temperature applied taking into consideration the resisting load.

Preferably, the solid medium comprises a bi-metallic strip which may take the form of a continuous band or a length of band for applications of limited engine movement. With such a band or bi-metallic strip, a heating of a portion of the band changes the curvature of this portion relative to adjacent portions of the band such that the band will tend to move in the direction appropriate to relieve the distortion. In one application, the applied force of the band may be effected by a roller biased against the surface of the band so that a force is exerted on the band which is always normal to the surface. When this surface portion is distorted or its curvature changed as a consequence of application of heat, a force component will be generated in a given direction and as a consequence of suitable mounting of the band for movement, the band will be urged in the direction of this force component. One example of a simple mounting means would be a pair of pulleys spaced apart a given distance about which the band passes.

The speed or rate of movement of the band may be readily indicated by a suitable take off roller or a shaft connected directly to one of the mounting pulleys. This speed, as stated, will be a function of the degree of heat applied to the portion of the band.

A better understanding of the foregoing, as well as numerous applications of the thermal engine will be had by now referreding to the accompanying drawings, in which.

Figure 1:
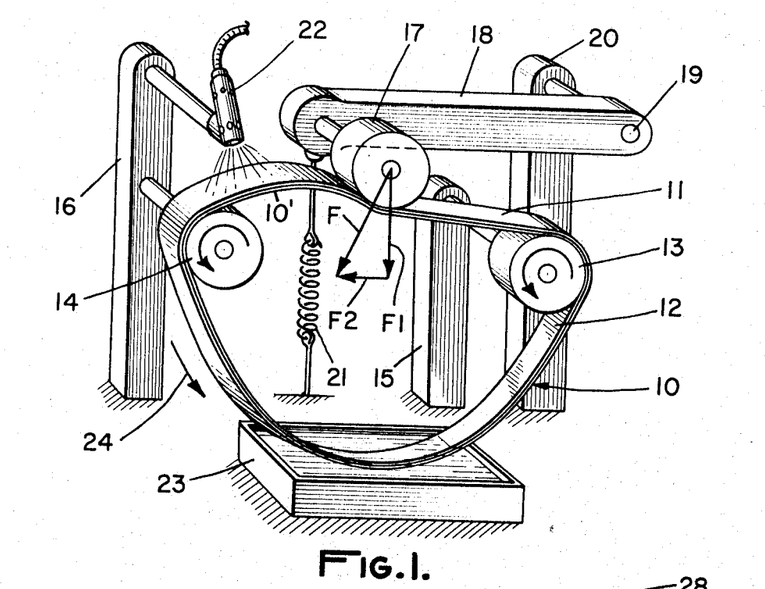
FIGURE 1 is a schematic perspective view illustrating the basic components making up a solid medium thermal engine of this invention.

Referring first to FIGURE 1, the engine comprises a solid medium in the form of a band 10. In the particular embodiment chosen for illustrative purposes, the band 10 is formed of bi-metallic material. There is thus defined an outer band 11 of a first metal, such as copper, having a high coefficient of thermal expansion, and an inner band 12 of invar constituting a low thermal expansion material. The overall band may be of the order of .020 inch thick and approximately one-half inch wide. The perimeter of the closed loop defined by the band may be of the order of 30 inches.

As shown, there is provided a mounting means for the band 10 in the form of spaced pulleys 13 and 14 supported at a given distance from each other as by supports 15 and 16. The engine also includes means for applying a force to a portion of the band. In the embodiment illustrated, this means takes the form of a roller 17 mounted on the end of an arm 18, the other end of which is pivoted for swinging movement at 19 to a stationary support 20. A biasing means in the form of a spring 21 urges the roller 17 against the top surface of the band portion 11 as shown.

The engine operates in response to heat, either directly applied or in the form of a heat sink. In FIGURE 1, there is shown schematically a torch 22 mounted on the upper portion of the support 16 for directing heat to a portion of the band 10, as indicated at 10'. A cooling agent in the form of a water bath 23 is shown disposed below the band for receiving portions of the band as the same moves about the pulleys 13 and 14. With the heat source in the form of the torch 22 positioned to the left of the force applying roller 17, as illustrated, the band 10 will be caused to move in the direction of the arrow 24.

The manner in which the heat from the torch 22 is converted into mechanical movement of the band 10 will be evident by referring to the force diagram in the center portion of FIGURE 1. In the absence of any heat from torch 22, the band 10 will be symmetrical with respect to the point of application of the roller 17. Since the roller effects line contact with the top surface of the band, the force of engagement with always be directed normal to the surface of the band. If now heat is applied by the torch 22 to a given portion of the band indicated at 10', a part of this portion being engaged by the roller 17 to one side of the center line of the portion, the band will become distorted as a consequence of its bi-metallic properties. The distortion essentially results in a change in curvature of the band at the portion 10' thereby changing the direction of the force applied by the roller 17. This direction change is indicated by the force vector F which is, as stated, necessarily normal to the surface of the band. However, as a consequence of the change in curvature or distortion of the band, the force vector will be at an angle to the remaining portions of the band to the right of the roller.

The force vector F may be broken into two force components F1 and F2. The component F1 will be directed vertically downwardly and have no effect in moving the band. However, the force component F2 will be substantially directed in the longitudinal direction of the band 10 between the pulleys 13 and 14 and will thus urge the band in a direction to pass about the rollers as indicated by the arrow 24. The cooling bath 23 functions to restore the distorted portion to an undistorted configuration as the heated portion passes through this bath so that the band regains its original shape before passing under the roller 17 and heat source 22.

It will be evident from the foregoing, accordingly, that the heat from the torch 22 is converted directly into a mechanical motion of the band 10 about the pulleys 13 and 14. It will also be evident that the extent of distortion or rate of change in curvature of the band portion 10' will be a function of the degree of heat applied by the torch 22. As a consequence, the component force vector F2 will be a function of the change in curvature of the band portion 10' and will increase with greater curvature so that the speed or rate of movement of the band about the pulleys will be a function of the heat source applied to the portion 10'.

Figure 2:
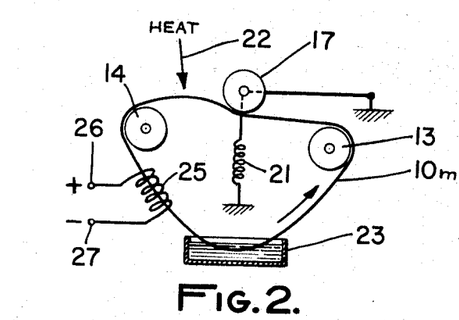
FIGURE 2 is a simple schematic diagram illustrating one use of the engine for generating electricity.

Referring now to FIGURE 2, there is schematically indicated a use for the thermal engine of FIGURE 1 wherein the band may be employed to generate directly electrical power. Towards this end, the band is magnetized and in FIGURE 2 is indicated at 10m. A coil 25 is positioned to surround the band 10m as shown so that movement of the band through the coil will generate electricity in the coil which may be removed from suitable output terminals 26 and 27. The voltage generated at the terminals 26 and 27 will be a function of the speed of the band 10m through the coil 25 and since the speed is a function of the heat applied as schematically indicated by the arrow 22 corresponding to the torch 22 of FIGURE 1, the electrical output from the coil 25 will be a function of this heat.

Figure 3:
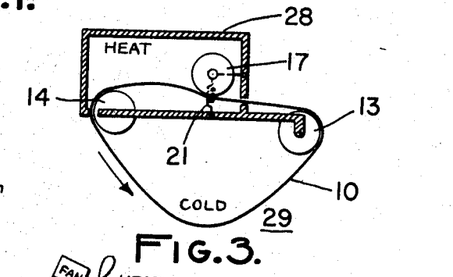
FIGURE 3 is another schematic diagram illustrating the manner in which the engine may be employed as a heat exchanger.

FIGURE 3 illustrates schematically the manner in which the engine of FIGURE 1 may be employed as a heat exchanger. Towards this end, there is shown an enclosure 28 defining in its interior a heated region through which a portion of the band 10 is caused to pass. The exterior of the enclosure 28 is at a lower temperature as indicated at 29. As a consequence, the portion of the band within the heated enclosure 28 will be distorted to result in movement of the band so that the heated portions will be carried to the outside and yield heat to the ambient environment.

The embodiment of FIGURE 3 thus provides essentially a heat exchanger wherein the band 10 constitutes the medium for transferring heat automatically from the interior of the enclosure 28 to the exterior of the enclosure. The greater the heat differential between the interior and exterior of the enclosure, the faster the band will move so that the rate of heat exchange is controlled automatically by the degree of heat differential. The embodiment of FIGURE 3 functions as well with the high and low temperature regions interchanged.

Figure 4:
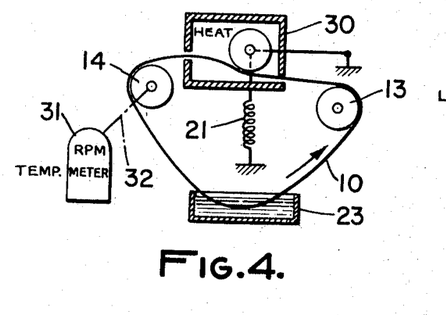
FIGURE 4 is another schematic diagram illustrating the manner in which the engine may be employed for measuring very high temperature.

FIGURE 4 illustrates still another manner in which the thermal engine of FIGURE 1 may be used. In this embodiment, the band 10 is arranged to be passed through a housing 30 within which a very high temperature exists. A suitable measuring or indicating device 31, such as a tachometer or r.p.m. meter is connected by a shaft indicated schematically at 32 to a suitable take off roller or one of the pulleys, such as the pulley 14. With this arrangement, the r.p.m. reading on the device 31 will be a function of the speed of the band 10 and thus a function of the temperature within the housing 30. There is thus provided a temperature measuring device particularly well suited for indicating extremely high temperatures. The advantage in employing the structure of FIGURE 4 is that the portions of the band heated within the housing 30 are in constant motion so that even though a very high temperature exists within the housing, the length of time that the band is subjected to such temperature is relatively short. In known temperature measuring devices, the temperature sensitive element is maintained in the temperature environment for a long time and thus subject to damage if the temperature is exceedingly high. In the embodiment of FIGURE 4, however, the rapid movement of the band, which movement increases with increased temperature, insures that no one portion of the band will be subject to the high temperature for a sufficient length of time to damage the same.

Figure 5:
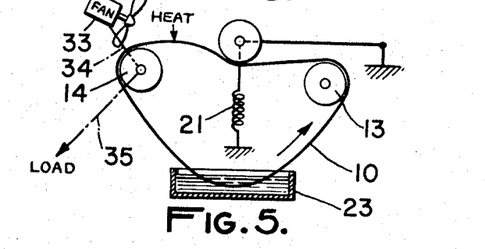
FIGURE 5 is a schematic diagram of the thermal engine illustrating its self-regulating features.

FIGURE 5 illustrates yet another use of the thermal engine wherein a self-governing or self-regulating feature is noted. In this structure, there is provided a cooling means such as a fan 33 arranged to be driven by a shaft schematically indicated 34 connected to the pulley 14 or any other suitable take off roller. If the intensity of the heat source is increased, the speed of the band 10 and therefore the r.p.m. of the fan 33 will increase, thereby causing increased dissipation of heat from the system to compensate for the increase in the heat source. The engine operation adjusts itself in a similar way for any variation in the heat source. The engine thus incorporates the feature that it regulates or governs itself to an equilibrium speed of movement directly according to heat applied. This governed movement may be coupled out of the system by a second shaft 35 connected to a suitable load and to the output pulley 14.

Figure 6:
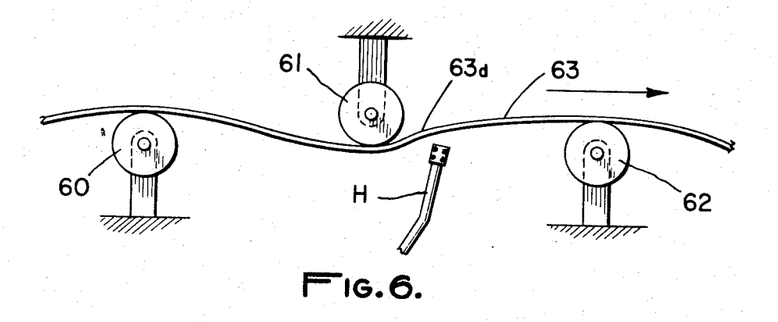
FIGURE 6 is a modification of the continuous band of FIGURE 1 to a more simple form wherein an arbitrary length strip or continuous loop of the solid medium (e.g., bi-metallic material) is being caused by heat distortion to pass over two pulleys.

FIGURE 6 is merely shown to illustrate the basic simplicity of the engine; thus, in FIGURE 6, there is shown a pulley 60, another pulley 61, and a further pulley 62. A bimetallic strip 63 passes over the pulley 61 and thereafter over the pulley 62. Heat may be applied to the strip 63 in a region proximate the pulley 61. In consequence, distortion of the strip will occur as the region 63d to cause movement in the direction indicated by the arrow. By merely closing the ends of the strip and forming a continuous loop, the engine of FIGURE 1 is formed.

Figure 7:
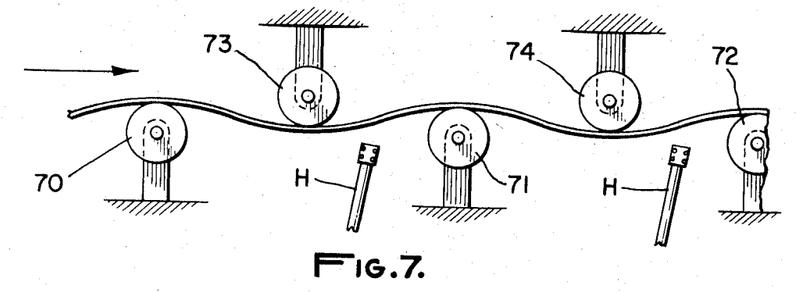
FIGURE 7 is a schematic illustration of a variation of FIGURE 6 wherein a plurality of pulley sets are employed and wherein heating and cooling occurs in alternate order.

FIGURE 7 illustrates a modification of the schematic showing of FIGURE 6 wherein the strip passes alternately over a series of heating and cooling pulleys, the cooling pulleys being indicated, for example, by the numerals 70, 71, and 72—while the heating pulleys are indicated by the numerals 73, and 74. The distortion and consequent movement of the strip would be similar to that shown in FIGURE 6.

Figure 8:
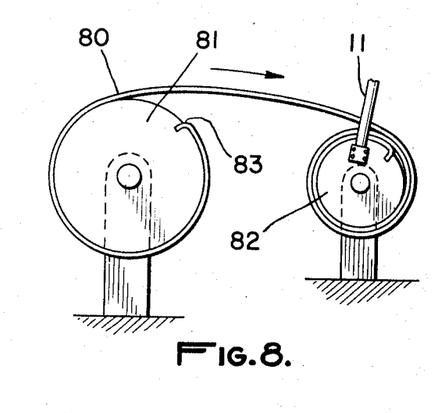
FIGURE 8 is a schematic illustration of limited engine movement.

In FIGURE 8, a particular application and variation of the engine is shown wherein limited movement of the bimetallic strip 80 is achieved over pulleys 81 and 82. Thus, an end 83 of the strip 80 is fixed to the pulley 81 wherein by application of heat H to pulley 82, the strip 80 will tend to unwind itself from the pulley 81 and wind up on pulley 82.

Figure 9:
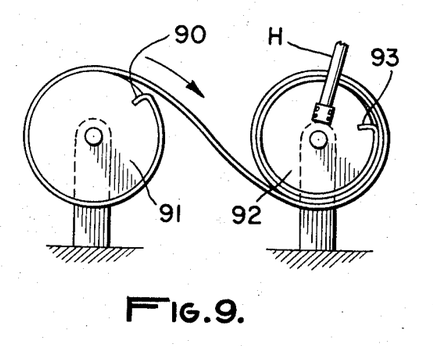
FIGURE 9 is a modification of the schematic showing of FIGURE 8 in which the sides of the band are reversed as the band is wound up.

In the event it is desired to have the strip wind up with the strip reversing its sides, the modification of FIGURE 9 may be used wherein a strip 90 winds from pulley 91 onto the pulley 92. The distinction between FIGURES 8 and 9 is that the end 93 of the strip is fixed to the pulley 92 in such a manner that the strip 90 is caused to pass around the bottom of the pulley rather than over the top as in the view of FIGURE 8.

It will be appreciated with either the configurations of FIGURE 8 or FIGURE 9 that the removal of the heat will cause the strip to wind itself back from the pulley 82 to pulley 81 and from pulley 92 to pulley 91, respectively. Mechanical means may be coupled to either or both pulleys to tap work from the engine in either portion of the cycle.

It will also be appreciated that the engine may be driven by application of electrical current through the strip as well as by the application of heat to the pulley as indicated.

For greater or less capacity of the bi-metallic strip to deform, and depending upon the sensitivity desired, the pulleys 82 and 92 may be made smaller or larger.

The limited travel engine of FIGURES 8 and 9 is suitable for many applications, in which only a small degree of movement is required, for example, in actuating a valve from one position to another, to open or close a damper in a duct, to trip a switch, to open a latch, and the like.

In FIGURES 10 through 15, there are illustrated several variations of another basic engine configuration.

Figure 10:
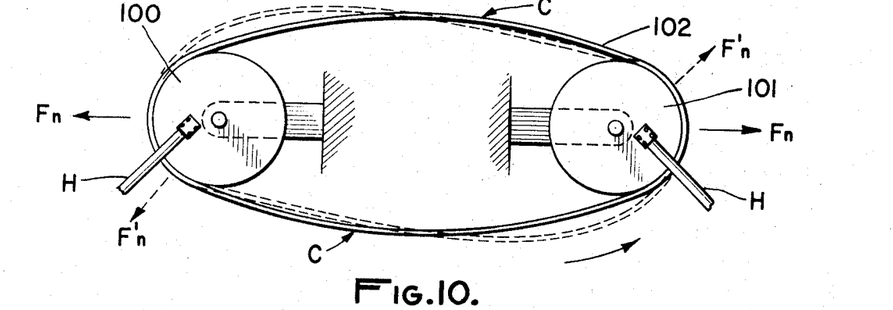
FIGURE 10 is a perhaps more simplified version of the thermal engine of FIGURE 1 wherein only two pulley members are used.

Thus, there is shown in FIGURE 10, a pulley 100 fixed for rotation about its own axis and another pulley 101 fixed for rotation about its axis. Sprung into positions about the pulleys 100 and 101 is a solid medium thermal band 102, preferably formed of a bi-metallic material. The band 102 normally has a circular shape and must be distorted to be placed in the solid line shape indicated so that a force normally acts against the band in a direction shown by the solid line arrows indicated by $F_n$. The band 102 may be caused to rotate about the pulleys 100 and 101 by several types of heat application.

In one form, heat may be applied as indicated by H to the pulley 100 as such. Preferably, in this form of application, the strip or band 102 has the high expansion side of the bi-metallic material used turned inwardly. Theoretically, an unstable equilibrium will occur with such heat application if the heat is uniformly applied to the pulley 100. However, such theoretical uniform distribution of heat does not occur and the band 102 will have a tendency to move away from the pulley 100 more in one direction than in another direction. Depending upon the direction of movement in which the band 102 is initially urged (and it is desirable with this type of application that some type of initiating movement be given to the band 102) the band 102 will continue to move in that direction. Thus, a normal force as indicated by the dotted line designation $F_n$ will be angulated as indicated at $F_n'$ with respect to the center line of the pulley 101 such that the band 102 will be caused to rotate in the direction of the arrows as shown. The amount of heat applied at H will determine the distortion and in turn the velocity of movement of the band 102. This velocity of movement can be substantially increased, however, by appropriate cooling in a region of the band as indicated at C.

It will be appreciated that this embodiment of the thermal engine as shown in FIGURE 10 represents a more simplified form of the device than that shown in FIGURE 1, although the band necessarily must be stretched or sprung into the oval position indicated from its normal or circular configuration in order to create the force $F_n$ which is essential to movement.

In another form of heating means, the high expansion side of the band 102 may be on the outside and the band instead of being heated in the area of the pulley 100, as indicated, or at 101, may be heated where the cooling region C is indicated. The band thereafter may be cooled at the pulleys 100 and 101, or it may be heated at only one of the locations C and cooled at both pulleys and at the other location C. In either case, the band will rotate although the distortions will be in somewhat different areas and instead of having the dotted line showing as indicated, the dotted line showing will be diagonally opposite.

Figure 11:
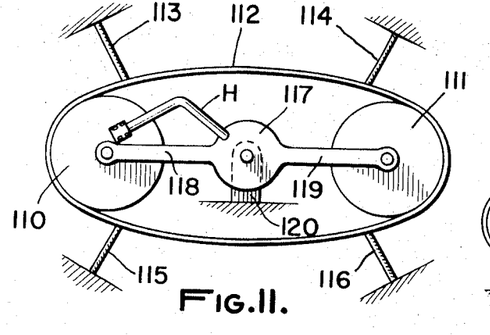
FIGURE 11 is a modification of FIGURE 10 in which the solid medium bi-metallic strip is held stationary (relative to rotation) while a carriage carrying pulleys is caused to rotate by the application of heat.

In FIGURE 11, there is shown a variation of the thermal engine of FIGURE 10 in which instead of having the band or solid medium member move, a carriage is caused to move within the band by distortion of the band as such.

Thus, referring to FIGURE 11, there is shown a pulley 110 and a pulley 111, having a continuous band 112 positioned therearound in the same manner as the construction of FIGURE 10. In this instance, however, ties 113, 114, 115, and 116 are secured to the band 112 so as to prevent its rotation although still permit its deformation.

Coupled between the pulleys 110 and 111, is a carriage 117 which has frame members 118 and 119 carrying pulleys 110 and 111 for movement therewith. The carriage 17 as such is designed for rotation about a fixed post or member 20. The carriage also includes heating means H designed to heat the pulley 110 and effect movement of the band 112 in the same manner as the construction shown in FIGURE 10. Snice the band is held by the ties 113–116, the net effect will be that the carriage 117 will tend to move wherein the pulleys or rollers 110 and 111 as such rotate about the pivot point of the post 120 causing continual changing in shape of the band 112 initiated through its own distortion by the heat means H.

Figure 12:
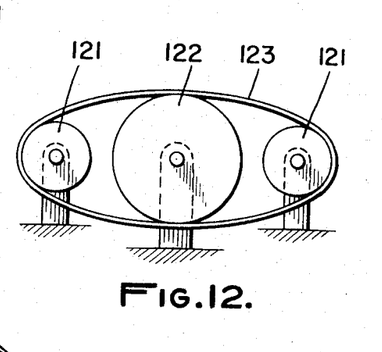
FIGURE 12 is a further variation of the thermal engine of FIGURE 10 in which the central pulley may be used as a heat transmitting means.

A modified form of the thermal engine of FIGURE 10 is also shown in FIGURE 12, wherein there is indicated a pulley 120 and a pulley 121 with a somewhat larger pulley 122 interposed therebetween. Encircling the pulleys is a band of bi-metallic strip material 123.

The third pulley 122 functions either as a heat transfer member to transfer heat into or away from the band 123.

Thus, if an application is employed wherein the band is heated at the pulley areas (as indicated in FIGURE 10, for example) then the pulley 122 would act for cooling purposes and would be thermally coupled to a cooling medium; on the other hand, if heat is applied to the areas indicated by C in FIGURE 10, the pulley 122 would act for heating purposes and might be thermally coupled to a heating medium. The pulley 122 thus provides a convenient means of heat transfer into or out of the thermal engine.

Figure 13:
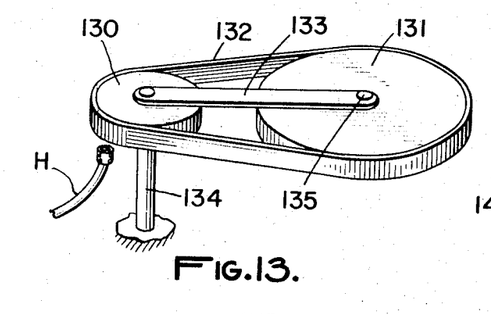
FIGURE 13 is a variation of the thermal engine of FIGURE 10 in which one of the pulleys is fixed while the other pulley is free toturn on its own axis and yet is secured to the first pulley such that the other pulley moves in a circle around the fixed pulley.

In FIGURE 13, there is shown a somewhat different form of the thermal engine of FIURE 10. In this configuration, a pulley 130 is coupled to a pulley 131 through a band 133. However, in this instance, the pulley 130 is a fixed pulley provided with a frame 133 intercoupled between pulleys 130 and 131.

With such a construction, the frame 133 is free to turn on the axis of the pulley 130. In this embodiment, the pulley 131 will rotate in a circular path about the pulley 130 while at the same time rotating about its own axis as driven by heat H applied to the pulley 130. Thus, the post 134 shown is a stationary post holding the pulley 130. Many variations may be made in this particular type of engine to increase its efficiency. Thus, the pulley 131 may be hollow, fitted with fins, etc., to increase its cooling. Furthermore, a vane or blade may be affixed to the frame to direct an air stream over the side of the band to be cooled.

Certain advantages are achieved in this configuration since the pulley 131 serves as a fly wheel mass; furthermore, heat may be passed upwardly through the post 134 which is stationary. A still further advantage is that the engine itself is in motion about the fixed axis 134 and will necessarily create its own convective cooling effect. Normally, the pulley 131 will be larger than the pulley 130, assuming that heat is being applied to the pulley 130.

Figure 14:
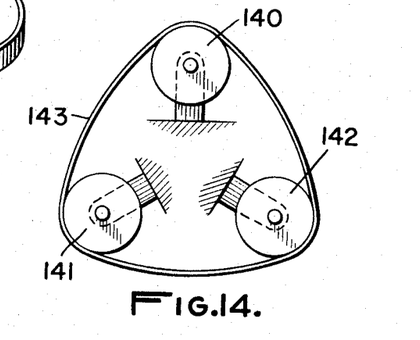
FIGURE 14 is a schematic illustration of a variation of the thermal engine of FIGURE 10 in which a plurality of pulleys are employed.

A still further variation of the thermal engine of FIGURE 10 is shown in FIGURE 14. The showing of FIGURE 14 is merely to disclose that a plurality of pulleys, 140, 141, and 142, may be encircled by a band 143 with the same effect being achieved as in FIGURE 10 with the result of a three cycle engine instead of a two cycle engine. This configuration may be modified to incorporate any given number of supporting and biasing pulleys.

Figure 15:
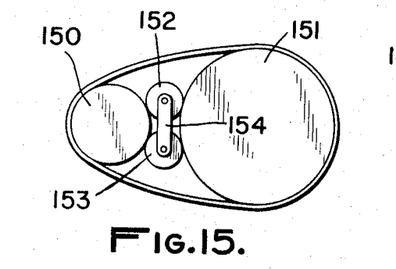
FIGURE 15 is a variation of the thermal engine of FIGURE 10 in which the pulleys are caused to move upon common rollers rather than about pivots of their own axes.

An important variation of the construction of FIGURE 10 is shown in FIGURE 15 wherein instead of having the pulleys 150 and 151 rotate on their own axes by center bearing members or the like, they are instead caused to rotate on rollers 152 and 153 held together by a frame 154. Thus, the configuration of FIGURE 15 may be applied to any of the constructions as indicated, for example, in FIGURES 10–14 to allow the pulleys to roll on the rollers rather than to be pivoted about a member extending through its own particular axis. This type of construction thus enables the elimination of certain design limitations otherwise improved by the illustrative forms of the invention heretofore shown with respect to FIGURES 10–14.

Figure 16:
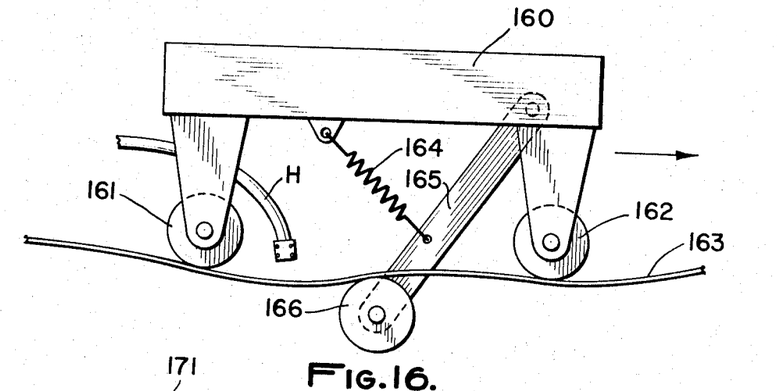
FIGURE 16 is an illustration of a variation of the thermal engine of FIGURE 6 in which heat is applied in such a manner as to cause a carriage to roll along the solid medium rather than having the medium roll along or over pulleys.

In FIGURE 16, there is merely indicated another version (of a different form than that shown in FIGURE 11) wherein a carriage means moves along the strip rather than having the strip move over the pulleys. Thus, referring to FIGURE 16, there is shown a carriage 160 having rollers 161 and 162 positioned as a framework on a solid medium thermal bi-metallic strip 163. Spring means 164 may be carried by the carriage 160 and biased by an arm 165 into a position such that a roller 166 will bear up against the strip or band 163 at a point or region adjacent to the heating member H. The result of this will be similar to the force diagram shown in FIGURE 1. By having the strip held at its opposite ends, the carriage will be caused to move thereover in the direction indicated.

Figure 17:
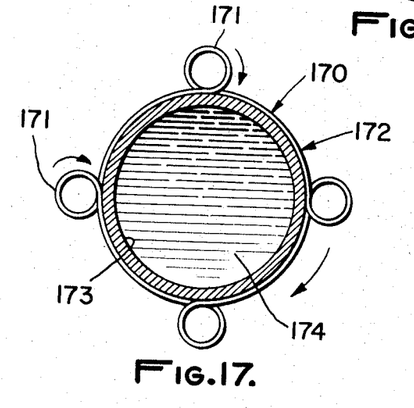
FIGURE 17 illustrates a variation in the configuration of the thermal engine to provide several cycles simultaneously in one continuous strip.
Figure 18:
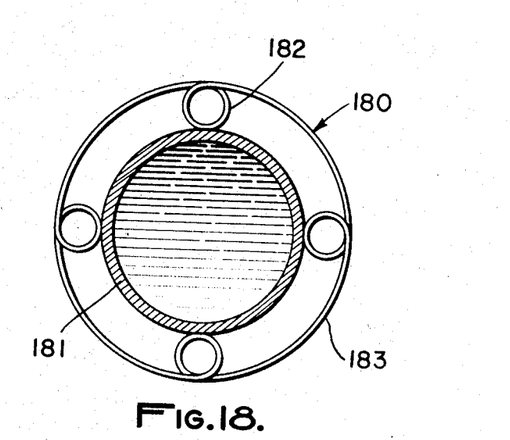
FIGURE 18 shows another variation of FIGURE 17 wherein the configuration is inverted or reversed by twisting the band inside out.

In FIGURES 17 and 18, there are shown engines having several cycles by creating somewhat unusual configurations of the continuous band of bi-metallic material.

Thus, there is shown in FIGURE 17, a band 170 having external loops 171 and arcuate portions 172. The band 170 encircles a hollow tube 173 which may have a fluid 174 therein to act as a heating medium. In the alternative, the tube 173 might be solid and heated. Heat will tend to cause a curling of the band which in turn will tend to move the band in a direction of the curling or towards the loop as indicated by the arrows. In order to achieve this motion, the high expansion side will be on the inside of the arcuate regions 172. With such a configuration, the band will be heated at the arcuate portions 172 and cooled in the external loop portions 171. Thus, where the band 170 and tube 173 are in contact, heating will occur and in the regions of the external loops, cooling will occur. The two sides of the external loop 171 must be, of course, free to slide over each other where they cross.

In more detailed operation, the curvature of the band 170 at 172 will tend to increase as it is heated by the tube 173. It will then tend to seek a high curvature region or the external loop. The strip is thereby caused to move from the region 172 to the region 171, and the entire band configuration is caused to rotate about 173.

It will be appreciated that the number of external loops, band thicknesses, and the like, are arbitrary within the limits of a tube of given size and heat capacity as well as functional requirements.

As indicated in FIGURE 18, the structure of FIGURE 17 may take a reverse form in which a band 180 encircles a tubular member 181 which may again be furnished with a heating medium or which may be in solid form, if preferred. The band 180 has internal loop portions 182 in contact with the tube 181 and arcuate portions 183 spaced therefrom. In this configuration, the high expansion side of the loop is again inside at the portions 183, although heating will be occurring in the internal loop portions 182 because of the contact of the band 180 with the tube 181 in the loop portions.

It will be appreciated that this design may be changed such that the tubular member acts as a cooling medium instead of a heating medium and the bi-metallic strip may be reversed from side to side. In either configuration, it is desirable that the band is performed or prestressed in a twist and the twist may be wound into the loop configuration. This will help the loop to remain stable.

If desired, pulleys may be mounted in the external loops of the configurations shown in FIGURES 17 and 18. These pulleys may, in turn, be pivoted on a frame which is mounted free to rotate about the central tube 173. These may be used to enhance mechanical stability or for heat transfer problems, for example, by mounting vanes on the external loop pulleys for cooling.

The particular advantages of the engine design shown in FIGURES 17 and 18 is to achieve a greater number of cycles of the thermal engine in a smaller space.

Figure 19:
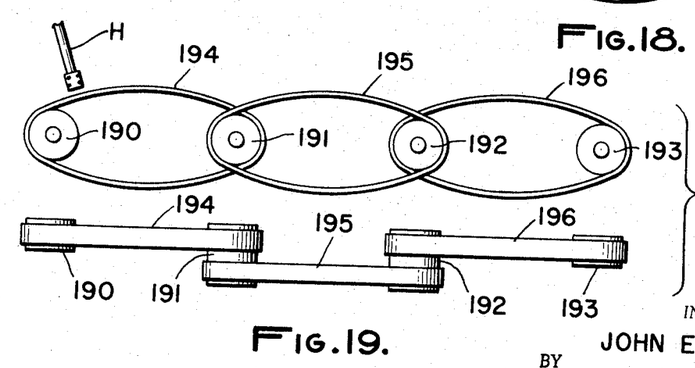
FIGURE 19 is an illustration of staging of the thermal engine of FIGURE 10; and, FIGURES 20 through 23 illustrate embodiments in which the band is positioned inside one of the pulleys or drums.

FIGURE 19 is merely an illustration of the various staging possibilities of the engine by disclosing one form of staging, for example, with the engine embodiment of FIGURE 10.

Thus, there is shown pulleys 190, 191, 192, and 193, and bands 194, 195, and 196. Assuming a heat input at H to pulley 190, the heat would be transferred through band 195 to pulley 192, and thereafter to band 196 to pulley 193. Thus, like turbines, staging would occur wherein the thermal engine would be more efficient by using up heat left in the band to drive a further band and in turn drive a further band, and so forth. Thus, the thermal engine is susceptible of conventional staging principles as applied to other types of heat engines.

As shown in FIGURES 20–23, the solid medium thermal engine of the present invention may be constructed in another basic configuration wherein the working solid medium band is situated within an enclosing pulley or drum. Thus, as distinguished from FIGURES 10–15 where the band encircles at least two drums or pulleys, the configuration disclosed in FIGURES 20–23 is such that the band is enclosed within one of the pulleys and co-functions with the other.

Figures 20, 21, 22, 23:
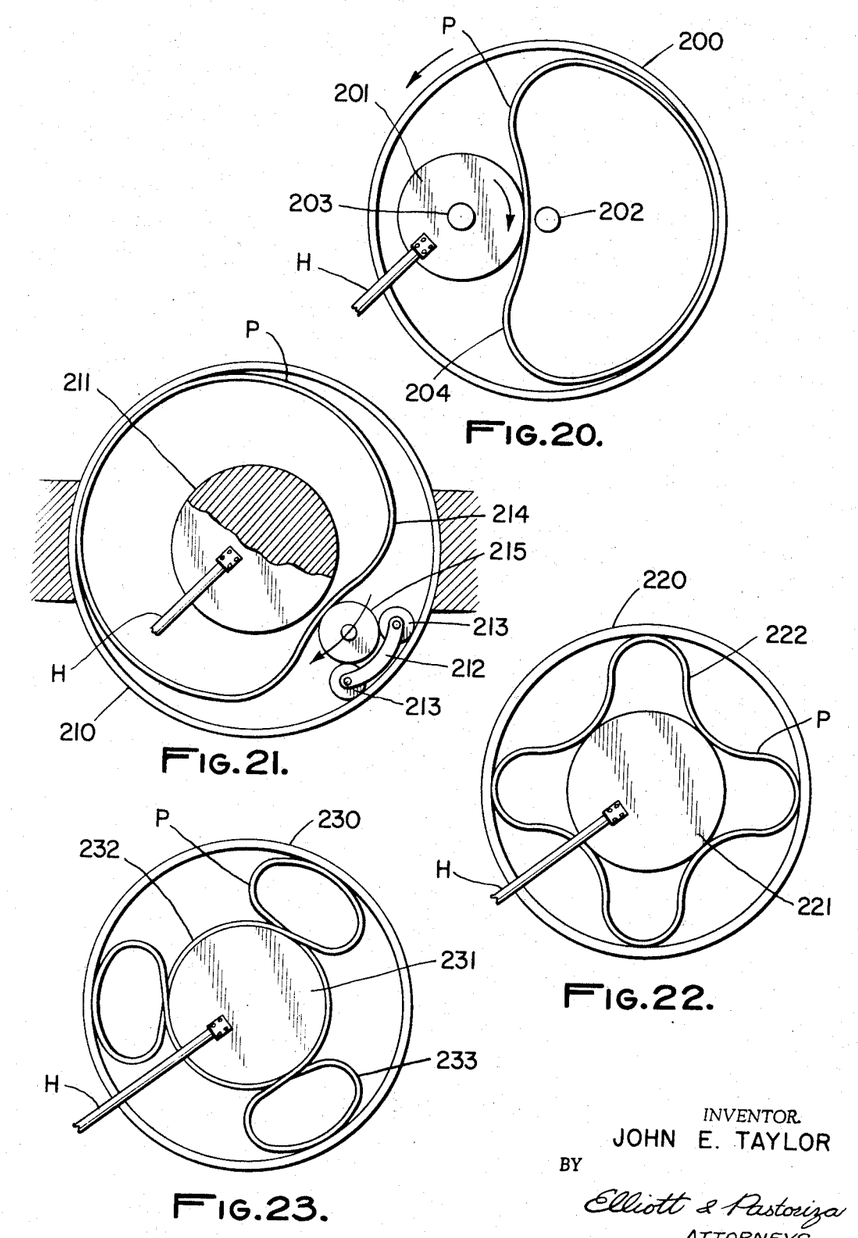

Thus, referring to FIGURE 20, thre is shown an outer drum or pulley 200 encircling a small drum or pulley 201. The pulley 200 pivots about a central axis 202, while the pulley 201 pivots about a central axis 203.

Interposed between the pulleys 200 and 201, is a solid medium band 204 preferably formed or bi-metallic material. The band 204 at the point P, for example, has its expansion side facing towards the pulley 201.

With such a construction, when heat is applied at H through a torch or the like to the pulley 201, the band 204 will be heated and will cause the pulleys 200 and 201 to rotate, for example, in the direction of the arrows indicated. Thus, the band 204 in the position shown in FIGURE 20, is sprung into the configuration thereof such that it exerts a force between the pulleys 200 and 201. When the pulley 201 is heated, the band 204 is distorted in such a manner that an unbalanced force condition occurs which causes the band 204 to rotate and thus drive the outer pulley 200 in a counterclockwise direction and the inner pulley 201 in a clockwise direction. The construction works as well with only one of the pulleys 200 or 201 pivoted if the two pulleys are concentric.

It will be appreciated that the band 204 could have its peripheral portion that is in contact with the pulley 200 forced inwardly to a shape similar to the portion in contact with the pulley 201 and that another similar pulley 201 could be mounted within the outer pulley 200 with the same type of motion being achieved. In other words, the number of inside pulleys 201 could be varied.

It should also be noted that instead of heat being applied to the pulley 201, the pulley 201 could be cooled and pulley 200 heated—and with the band inverted, the same type of motion could be achieved.

It will also be appreciated that many variations may be made upon the embodiment of FIGURE 20 using certain of the modifications heretofore shown with respect to other basic engine designs. Thus, the pulley 201 could be fixed and the pulley 200 could be mounted on a frame which pivots at 203. In such an embodiment, with heat applied to the pulley 201, the outer pulley 200 will rotate about its axis 202 while at the same time moving circularly about the pivot point 203. This modification would be similar to that shown in FIGURE 13, with a different engine design, of course.

A further modification could be made in which the outer pulley 200 would be fixed and in which a frame member would extend from the center of the inner pulley 201 to a pivot point 202. In such a case, heat applied to the pulley 201 would cause the frame to rotate about the pivot point 202, while the pulley 201 rotated about its own axis 203. Thus, the pulley 201 would orbit, so to speak, about the axis 202 while rotating about its own axis 203.

Another somewhat different form of the engine construction shown in FIGURE 20 is shown in FIGURE 21. In this design, there is shown a pulley or drum 210 which is fixed as indicated encircling another drum or pulley 211, also fixed, which may function as a heat shield means. Designed to ride on the inner surface of the drum is a carriage 212 having rollers 213.

Interposed between the drum 211 and the drum 210 is a bi-metallic band 214 which is designed to undulate so as to cause movement of a pulley or roller 215 mounted between the band 214 and the carriage 212 in the direction shown. Thus, when heat is applied at H to the member 211, because the band 214 is biased against the roller 215, a non-stable force will occur which will cause rotation of the roller 215 in view of distortion of the band 214 and the consequent movement thereof. In order to effect this type of movement, the band 214 has its expansion side at the point P located so as to contact the roller 215.

Again, with the design of FIGURE 21, certain variations may be made to cause different types of motion. Thus, if the pulley or drum 210 is allowed to rotate instead of being fixed, and if the carriage 212 is fixed instead of being free to roll, then if heat be applied to the pulley 211, both the outer pulley 210 and the roller 215 will rotate.

On the other hand, if in addition to making the pulley 210 free to rotate, it is pivoted at its center, a different motion will occur. Thus, assuming that the roller 215 is sufficiently weighted, heat applied through the pulley 211 will also cause the outer pulley 210 to rotate.

It also will be appreciated that a further modification may be made in FIGURE 21 in which the carriage 212 instead of being located between the pulley 215 and the pulley 210 may instead be positioned between the pulley 215 and the band member 214.

In FIGURES 22 and 23 are merely shown variations of the basic engine design embodying principles somewhat analogous to those shown with respect to FIGURES 17 and 18 with a different configuration. Thus, in FIGURE 22, there is shown an outer pulley 220 encircling an inner pulley 221. Interposed between the pulleys 220 and 221 is a band 222 which at the point P has its high expansion side facing outwardly from the pulley 221. If heat be applied to the inner pulley 221 at H, relative motion will occur between the outer pulley 220 and the inner pulley 221, assuming one of the pulleys is fixed.

In the embodiment of FIGURE 23, there is shown an outer pulley 230 and an inner pulley 231 about which is twisted a band 232 having looped portions 233. The high expansion side of the band 232 at the point P, for example, would be adjacent to the outer pulley 230. With this type of configuration, again relative motion may be achieved between the pulley 230 and the pulley 231 assuming one of the pulleys is fixed, and assuming, for example, that heat is applied at H.

Although many other uses constituting extensions of the basic concepts depicted in FIGURES 1–23 will occur to those skilled in the art, it will be clear that the present invention has numerous applications within the various embodiments and modifications herein shown. It is often desirable to prestress or preform the band in a longitudinal and/or transverse direction to improve the performance. It will be evident, for example, that by applying heat in different regions, by reversing the band to have the high expansion portion of the bi-metallic member on the opposite side, by forming the band in different configurations, by using rollers instead of pivots, and the like, various different engine designs may be achieved. It will be noted, however, that it is always essential to have regions of low curvature and high curvature, and also, it is essential that some distortion be created by heat and that there be some type of force imposed upon the band through pulleys or the like, which will permit this distortion to be changed into movement and in turn available mechanical energy.

What is claimed is:

1. A solid medium thermal engine including: an elongated continuous band of bi-metallic material defining a closed loop designed such that a portion distorts in response to a temperature change relative to remaining portions; and mounting means for said material such that a temperature change in said portion of said material results in a distortion of said material in a manner to generate a reaction force on said mounting means and result in relative rotation between said entire closed loop and said mounting means.

2. An engine according to claim 1, including temperature changing means for changing the temperature of said portion of said material to effect said distortion.

3. An engine according to claim 1, in which said mounting means includes a roller engaging said band; and means biasing said roller against said band such that a force is provided normal to the surface portion of said band engaged by said roller at all times, distortion of said portion resulting in generation of a component of said force in a direction to move said band relative to said mounting means.

4. An engine according to claim 1, in which said mounting means comprises at least two pulley spaced apart a given distance, said band encircling said pulleys.

5. An engine according to claim 1, in which said band is magnetized; and a coil surrounding said band so that movement of said band through said coil generates electricity in said coil.

6. An engine according to claim 1, including an enclosure through which said portion of said band passes, other portions of said band being exterior of said enclosure, said enclosure defining a high temperature region relative to the ambient temperature outside of said enclosure whereby heat is transferred from the interior to the exterior of said enclosure by movement of said band.

7. An engine according to claim 1, including a take off roller about which said band passes so that the r.p.m. of said roller is proportional to the speed of movement of said band; and means connected to said roller for providing an indication of the r.p.m. of said roller whereby said indication is a function of the degree of heat applied to said portion.

8. An engine according to claim 1, including a heat source positioned to heat said portion; and cooling means responsive to the speed of movement of said band for controlling the degree of heating of said portion by said heat source whereby an increase of heat applied to said portion results in an increase in the speed of movement of said band to thereby effect a cooling of said portion through said cooling means, and a decrease in the heat applied to said portion results in a decrease of the speed of said band to thereby effect a decrease in the effective cooling of said portion through said cooling means so that the speed of movement of said band reaches an equilibrium speed which is automatically maintained.

9. A thermal engine comprising: mounting means including at least two spaced rotative members; and a solid medium band designed to distort in response to a temperature change positioned around said two rotative members, said band being dimensioned and shaped in such a manner with respect to said rotative members as to create a force acting on said band such that a temperature change in a portion of said band distorts said band in a manner such that said force effects relative movement between said band and mounting means in response to said distortion.

10. A thermal engine engine according to claim 9, including temperature changing means associated with at least one of said rotative members.

11. A thermal engine according to claim 9, in which one of said members is fixed; and frame means securing the other of said rotative members to said one of said rotative members in such a manner that the other of said rotative members is caused to revolve circularly around said one of said rotative members to effect said relative movement.

12. A thermal engine according to claim 9, including means secured to said band for constraining movement thereof along its extent such that said force effects movement of said mounting means within said band in response to said distortion of said band.

13. A thermal engine comprising: a cylindrical member; means associated with said cylindrical member for heating the surface thereof; a continuous solid medium band closed on itself positioned around said cylindrical member, said solid medium band being looped at least once back upon itself in its encircling relationship to said cylindrical member, a portion of said band being in contact with said cylindrical member so as to receive heat therefrom, said heat from said cylindrical member being designed to distort said band in a manner such that said band is urged towards movement in response to said distortion.

14. A thermal engine comprising: first mounting means; a first solid medium band designed to distort in response to a temperature change positioned over said mounting means; said first band being mounted in such a manner with respect to said mounting means so as to have a force means acting thereon; temperature changing means designed to distort said first band in a manner such that said force means urges movement of said band in response to said distortion; second mounting means; a second solid medium band designed to distort in response to a temperature change positioned over a portion of said first mounting means said second band also being associated with said second mounting means; said portion of said first mounting means acting as a heat transfer member from said first band to said second band.

15. A thermal engine comprising: a first circular member of given diameter; a second circular member having a smaller diameter than said given diameter and mounted within said first circular member; a solid medium thermal band designed to distort in response to a temperature differential mounted within said first circular member and shaped to be biased into engagement therewith, said band being positioned such that at least one portion thereof is proximate said second circular member; and means creating a temperature change in said band whereby said band will be distorted and caused to rotate, at least one of said circular members being free to rotate in response to said rotation of said band.

16. A thermal engine, according to claim 15, in which heat is applied to said band through said second circular member.

17. A thermal engine according to claim 15, in which said circular members are concentric, and in which said band is interposed therebetween so as to define alternating regions of different curvatures.

18. A thermal engine according to claim 17, in which said band has at least one looped portion.

19. A thermal engine according to claim 15, in which both circular members are fixed; and roller means interposed between another portion of said band and the inner surface of said first circular member, said roller means rotating about the inner surface of said first circular member in response to said distortion.

20. A solid medium thermal engine comprising, in combination: a bi-metallic closed loop of material adapted to be positioned about a set of spaced rollers mounted in a frame; and a means to provide a temperature differential to different portions of said closed loop, the different portions of said closed loop being distorted due to a difference in temperature of said portions, the distortions causing said closed loop to bear against said rollers in such a manner as to produce a component of force tangent to said closed loop with a result that said loop is forced to rotate to cause said rollers to rotate.

21. An engine according to claim 20, wherein said loop is composed of inner and outer layers of metal alloys having significantly different coefficients of thermal expansion.

22. An engine according to claim 20, wherein two or more of said rollers are positioned so that distortion of said loop will cause said loop to react against said rollers causing said loop to rotate.

23. A thermal engine comprising: mounting means including at least two spaced rotative members; a solid medium band designed to distort in response to a temperature change supported by said rotative members for movement in a direction generally along the longitudinal extent of said band; and a force means engaging said band at a portion intermediate said rotative members such that a temperature change in the neighborhood of said portion distorts said band to create a component of force by said force means in said direction whereby said band is caused to move in said direction.

References Cited by the Examiner
UNITED STATES PATENTS

| | | | |
|---|---|---|---|
| 2,722,613 | 11/1955 | Culbertson et al. | 30—23 X |
| 2,729,756 | 1/1956 | Euler et al. | 60—23 X |
| 2,838,943 | 6/1958 | Modes et al. | 60—23 X |

ORIS L. RADER, *Primary Examiner.*

G. SIMMONS, *Assistant Examiner.*